Figure 4:
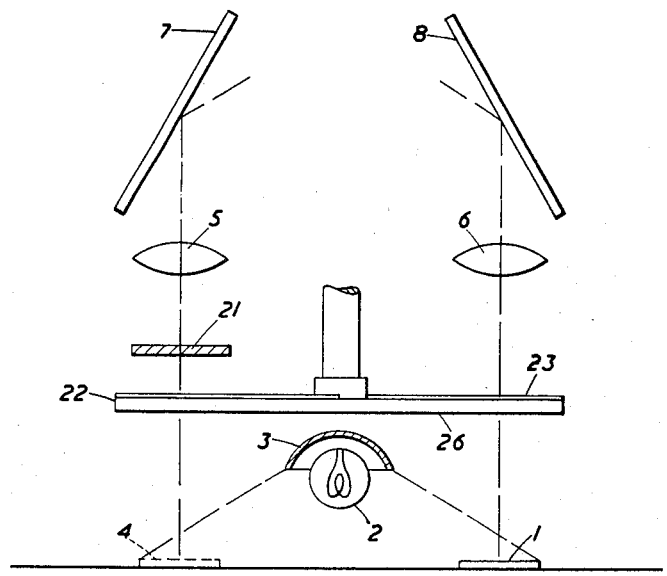

March 1, 1966  R. G. FIELDING  3,237,509
COLOUR COMPARATOR
Filed Aug. 29, 1961  5 Sheets-Sheet 1
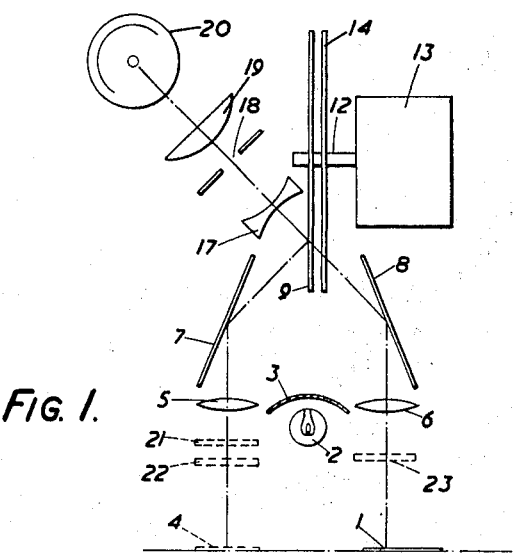
FIG. 1.
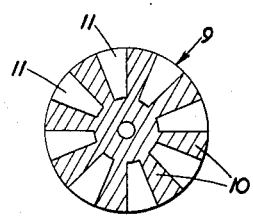
FIG. 2a
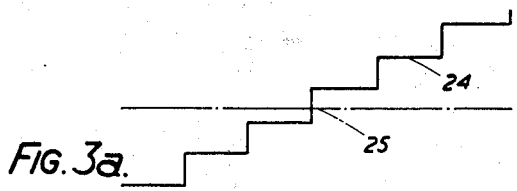
FIG. 3a.
FIG. 3b
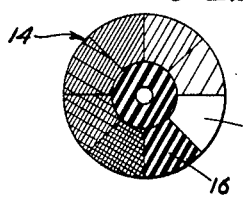
FIG. 2b
FIG. 3c.
FIG. 3d.
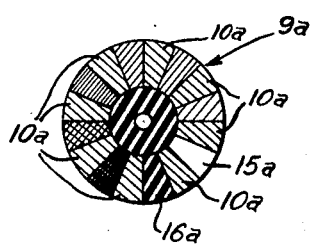
FIG. 2c
INVENTOR
Raymond Gordon Fielding
BY
Morrison, Kennedy & Campbell
ATTORNEYS March 1, 1966 R. G. FIELDING 3,237,509
COLOUR COMPARATOR Filed Aug. 29, 1961 5 Sheets-Sheet 2

INVENTOR
Raymond Gordon Fielding
BY
Morrison, Kennedy & Campbell
ATTORNEYS

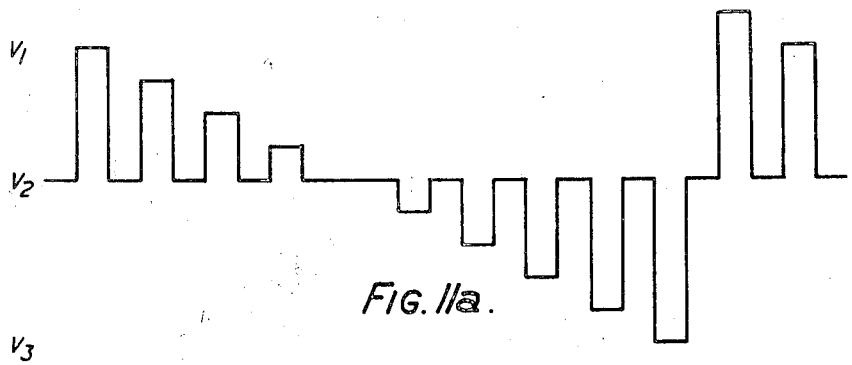
FIG.11a.
FIG.11b.
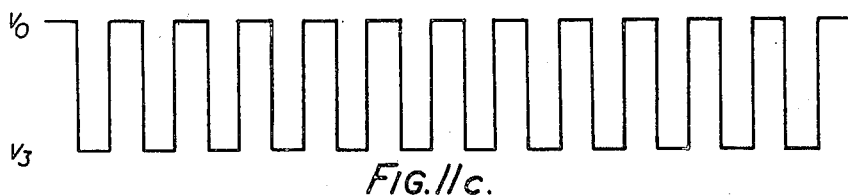
FIG.11c.
FIG.11d.
FIG.11e.
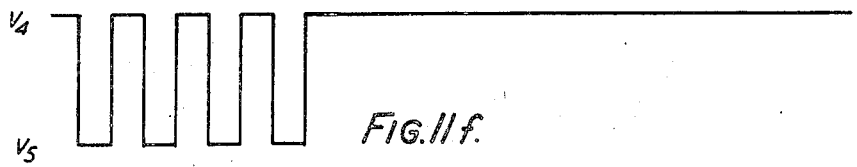
FIG.11f.

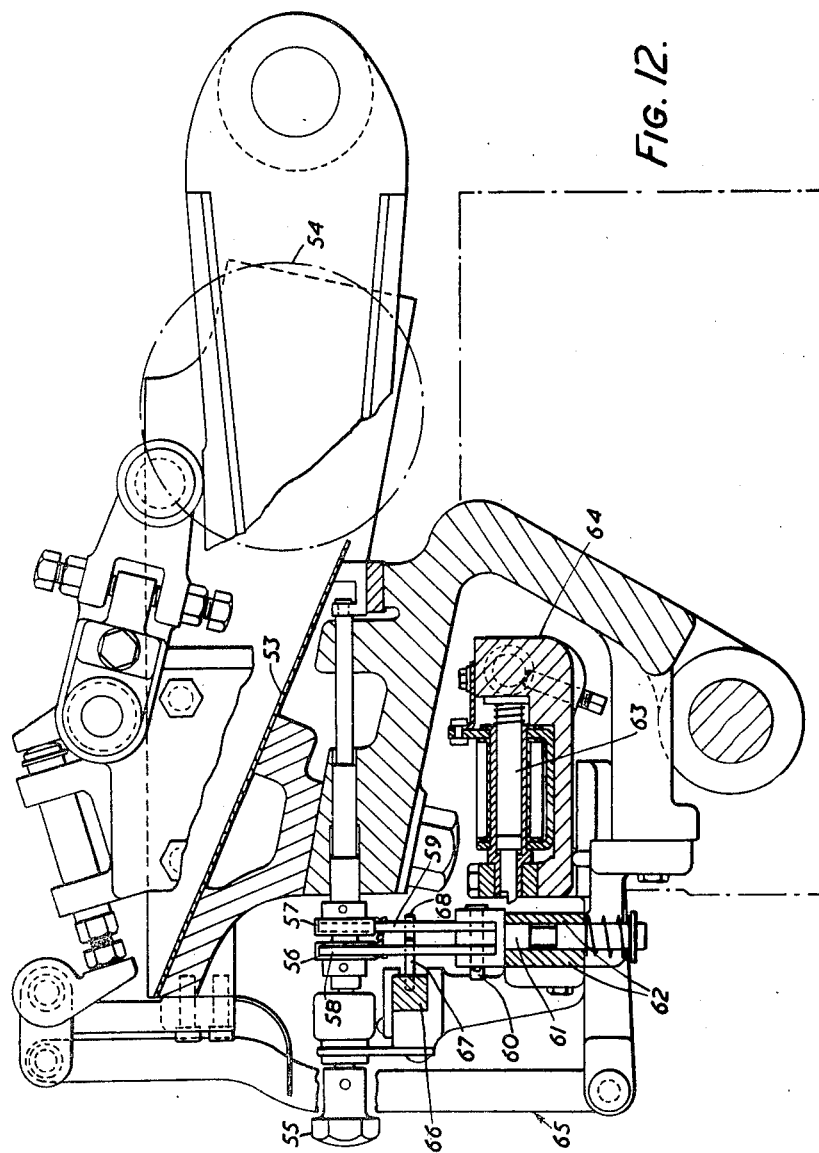

United States Patent Office 3,237,509
Patented Mar. 1, 1966

3,237,509
COLOUR COMPARATOR
Raymond Gordon Fielding, Lymm, England, assignor to Linotype and Machinery Limited, London, England, a company of Great Britain
Filed Aug. 29, 1961, Ser. No. 134,681
Claims priority, application Great Britain, Aug. 30, 1960, 29,872/60
6 Claims. (Cl. 88—14)

The present invention relates to a method and means for comparing colours. A particular application of the present invention is to the printing industry where, for example, a printing press minder requires accurate information to enable him to adjust the ink supply to increase or decrease the supply to ensure that the sheets being printed conform in colour density or intensity to a given control or master colour.

According to the present invention there is provided a colour comparator having means for cyclically interrupting and cyclically varying the intensity of light reflected from the master colour and scanned by a photoelectric cell, a photoelectric cell for scanning cyclically interrupted light reflected from the compared colour, a discriminator circuit fed with voltages proportional to the reflected light scanned from both the master colour and the compared colour, the output from the discriminator circuit being indicative of the relationship between the master colour and the compared colour.

The invention also provides a colour comparator wherein light reflected from a master colour is passed through means which constantly cyclically vary the intensity of light transmitted therethrough, the transmission of light also being cyclically interrupted, whereby pulses of light of cyclically increasing or decreasing intensity are sensed by a photoelectric cell, producing therefrom a cyclically variable voltage, light reflected from a colour to be compared being transmitted to a photoelectric cell in alternate phased relationship with the light pulses received from the master colour, a discriminator circuit eliminating pulse voltages above or below a certain level whereby the number of resultant pulses obtained in any given cycle will be indicative of the relationship between the master colour and compared colour.

A method, according to the present invention, of comparing a colour with a master colour consists in cyclically interrupting and cyclically varying the intensity of light reflected from the master colour, which reflected light is scanned by a photoelectric cell, scanning the reflected, cyclically interrupted light from the compared colour with a photoelectric cell, feeding a discriminator circuit with voltages proportional to the reflected light scanned from both the master colour and the compared colour, the output from the discriminator circuit being indicative of a relationship between the master colour and the compared colour.

Also according to the present invention, a method of comparing a colour with a master colour consists in cyclically varying the intensity of light reflected from the master colour, cyclically interrupting the reflected light from reaching a photoelectric cell, feeding the output from the photoelectric cell to a discriminator circuit to which is also fed a voltage obtained from a photoelectric cell scanning the colour to be compared, eliminating certain voltage pulses relative to the pulses obtained in respect of the master colour and the compared colour whereby the number of pulses ultimately obtained in any given cycle is indicative of the relationship between the compared colour and the master colour.

The present invention also includes a method of comparing a colour with a master colour consisting in cyclically varying the intensity of light reflected from the master colour, cyclically interrupting the reflected light from reaching a photoelectric cell, beaming onto the photoelectric cell reflected light from the compared colour in alternate cyclic interruption with the master colour, the cyclically variable voltage output from the photoelectric cell being fed to a discriminator circuit for eliminating unwanted pulses above or below a given level, the pulses ultimately obtained being indicative of a relationship between the compared colour and the master colour.

Included in the present invention is a method of comparing a colour with a master colour consisting in rotating a disc provided with alternating spokes of transparent and reflecting surfaces, rotating a disc with sectors of increasing opacity, beaming reflected light from a master colour through both discs onto a photoelectric cell and beaming a reflected light from the compared colour onto the disc having reflecting surfaced spokes, whereby the photoelectric cell will receive alternately light reflected from the master colour and from the compared colour, the reflected light from the master colour cyclically varying in intensity, and feeding the output from the photoelectric cell to a discriminator circuit to eliminate voltages below or above a given level whereby the pulses ultimately obtained are indicative of a relationship between the compared colour and the master colour.

While in describing the disclosed embodiment of the invention it is stated that light is reflected from the master and the compared colour, it is to be understood that the light can be passed through the colours as in the case of transparencies.

The colour comparator may be used simply to indicate a number, which would be the number of pulses from a photoelectric cell per cycle, to give an indication as to whether the compared colour was numerically greater or less than a given number for the master colour, or the output from a discriminator circuit may be fed to a meter giving a visual indication as to whether the compared colour is of the same chromatic intensity as the master colour. The colour comparator could also be used for the automatic control of the supply of ink from an ink fountain of a printing press whereby the uniformity of colour against a master colour would be ensured through a given run of the printing press.

Figure 5:
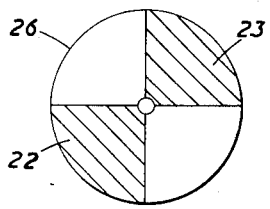
Figure 6:
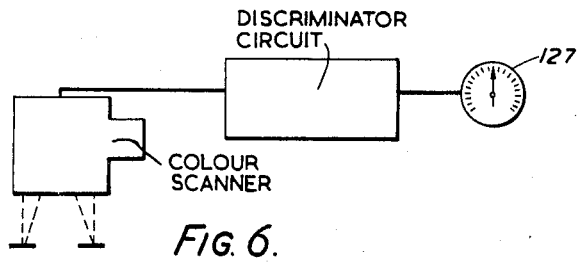
Figure 7:
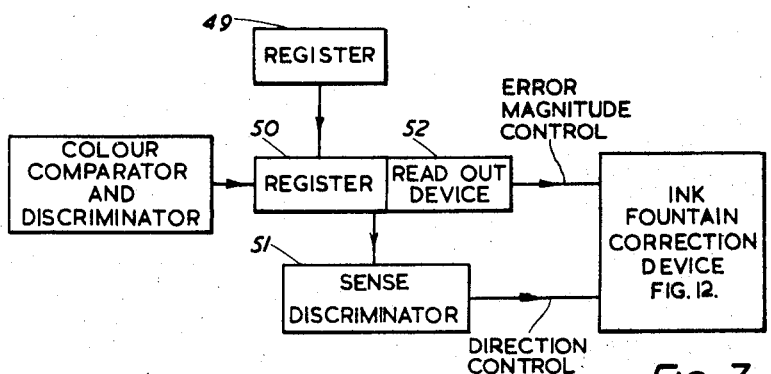
Figure 8:
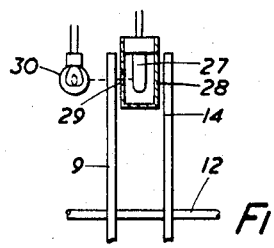
Figure 9:
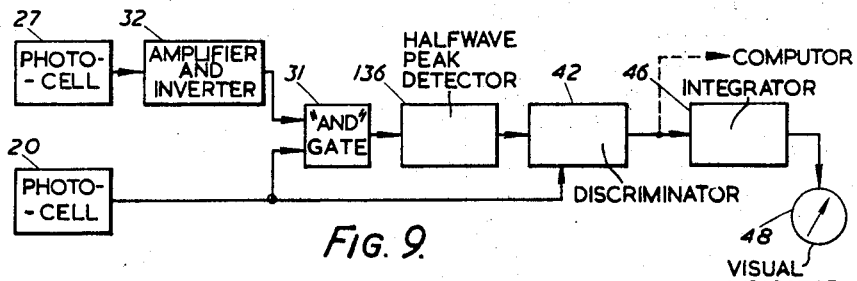
Figure 10:
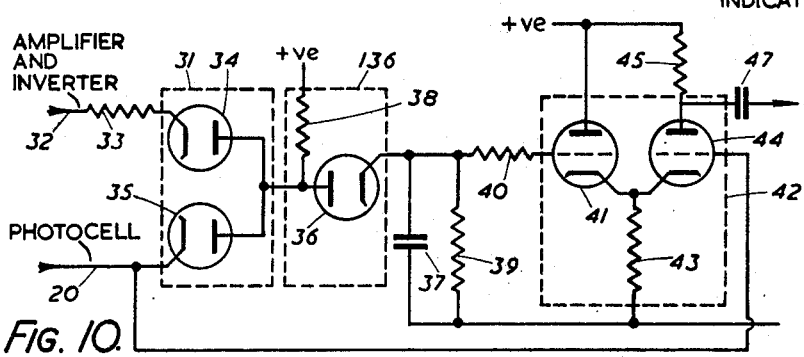

In the accompanying drawings, which illustrate examples of colour comparators according to the present invention:

FIGURE 1 is a schematic presentation of one example of a means for scanning the master and compared colours, FIGURE 2a shows the multi-fingered light reflecting disc or wheel, FIGURE 2b shows the sectored disc or wheel of varying opacity, FIGURE 2c shows a single disc that may be used in place of the discs of FIGURES 2a and 2b, FIGURES 3a, 3b, 3c and 3d show graphically the output from the photoelectric cell and discriminator circuit, FIGURE 4 is a schematic presentation of a modification of the lower portion of the scanning means shown in FIGURE 1, FIGURE 5 is a plan view of a colour filter wheel, used in the example shown in FIGURE 4, FIGURE 6 is a block circuit diagram of the colour comparator shown in FIGURE 1, FIGURE 7 is a block circuit diagram of the colour comparator used to control the ink fountain of a printing press, FIGURE 8 shows a detail of a modification of scanning means, providing a reference voltage, FIGURE 9 is a block circuit diagram of the scanning system incorporating the modification shown in FIGURE 8, FIGURE 10 is a circuit diagram of the arrangement shown in FIGURE 9, FIGURES 11a to 11f are graphical representations of wave forms derived from different parts of the circuit shown in FIGURE 10, and, FIGURE 12 is a side elevation of an ink fountain unit for control by the colour comparator.

Referring to FIGURE 1, a card or the like 1, having thereon a master colour is placed adjacent a source of light 2 provided with a reflector 3. The light also illuminates a card, or the like 4 on which is the colour to be compared. The compared colour may be on a sheet just printed.

Reflected light from the cards 4 to 1 passes through converging lenses 5, 6, respectively, and is reflected from plane mirrors 7, 8, respectively, to follow paths which intersect adjacent a multi-fingered disc or wheel 9.

The multi-fingered disc 9 has mirror surfaced fingers 10, the arcuate width of each finger being equal to the arcuate width of open space 11 between adjacent fingers.

The multi-fingered disc 9 is mounted on the spindle 12 of a motor 13 which rotates the disc at any desired constant speed. Also mounted on the spindle 12 and rotated thereby is a second disc or wheel 14 which is divided into sectors of increasing opacity, from transparent or substantially transparent 15, to opaque 16. Although eight sectors are shown in FIGURE 2b, this is for illustrative purposes only. Many more sectors may be provided, the more sectors provided the greater will be the degree of accuracy of colour comparison. The number of fingers on the disc 9 is the same as the number of sectors on the disc 14. A single disc 9a may be provided to perform the functions of discs 9 and 14. See FIG. 2c. In this case, the mirror surfaced fingers 10a will be located on each sector of increasing opacity as shown, and the disc will be mounted on the spindle 12 so that the light reflected from mirror 7 strikes the mirror surfaced fingers 10a.

Light reflected from the mirror 8 passes through the disc 14 and through the spaces between the fingers of the multi-fingered disc 9, giving pulses of light which pass through a collimating lens 17, slot 18 and condenser lens 19 to a photoelectric cell 20.

Light reflected from the mirror 7 is again reflected when it strikes one of the mirrored fronted fingers 10 of the multi-fingered disc 9 to pass to the photoelectric cell 20 along the same light path, pulse wise, but in out of phase relationship with the light from the mirror 8.

When the discs 9, 14 are rotating the photoelectric cell 20 will alternately receive pulses of reflected light from the colours of cards 1 and 4, but the colour from card 1 will cyclically vary in intensity of accordance with the position of the disc 14.

If desired a neutral density filter 21, having a density exactly midway between the lightest 15 and the darkest 16 shade on the disc 14, can be interposed above the card 4. Thus, if the colours reflected from the cards 1 and 4 were of equal value, the output from the photoelectric cell 20 in respect of card 4 would have a value midway between the maximum and minimum values of the output obtained in respect of card 1. The number of pulses obtained from the colour comparator for two matched colours would then be equal to one half of the number of segments on the disc 14.

A suitable pair of matched colour filters, 22, 23, can be interposed above the cards 4, 1 and the output from the colour comparator compared with the output without filters. By this means it would be possible, by the careful selection of the characteristics of the colour and the filters for the colour comparator with additional circuitry to separate and measure differences in hue as well as colour saturation between cards 4 to 1. The values of the filters 22, 23 would be chosen according to the spectral response of the photoelectric cell 20 and the colours of the cards 4 and 1.

In FIGURE 3a the outputs from the photoelectric cell 20 in respect of the reflections from the cards 4 and 1 are graphically represented, it being assumed in this figure that there is no interruption of light. Due to the rotation of the disc 14, the output 24 in respect of the colour from the card 1 is in increasing steps whereas the output 25 in respect of the colour from the card 4 would be a straight line, shown as a chain line.

When both discs 9 and 14 are operative, the output from the photoelectric cell 20 can be graphically represented as shown in FIGURE 3b, which is a combination of the outputs indicated in FIGURE 3a.

The output from the photoelectric cell 20 is fed to a discriminator circuit, FIGURE 6, of well known type which eliminates the voltage pulses which are in excess of those which would be generated by the output from the colour 4 alone. The result is shown graphically in FIGURE 3c. The number of pulses thus obtained in any given cycle, (i.e. one rotation of the discs 9, 14) three, as shown in FIGURE 3d, given an indication of the intensity of the colour from the card 4 in respect of the colour from the card 1. Thus there can be a standard number for any given colour, and an excess or deficiency of pulses would indicate the compared colour was more or less intense than the master colour. The standard number for any given colour can readily be obtained by first effecting a scanning cycle with two cards having the same colour thereon.

In the modification shown in FIGURE 4, the light filters 22 and 23 are mounted on a glass carrier 26 rotated at half speed of the discs 9, 14. The light source 2 is below the carrier 26. By virtue of the arrangement of the light filters 22, 23 on the carrier 26, FIGURE 5, the colour comparator will give two outputs alternatively, which outputs can be matrixed to give outputs which will be proportional to the two variables.

The pulses from the photoelectric cell 20, passed by the discriminator circuit can be utilised for the actuation of a meter 127, FIGURE 6, having a centre zero dial giving a direct indication as to whether the compared colour is more or less intense than the master colour. When the invention is applied to a printing press, the meter 127 may be calibrated in terms of adjustment required to the ink fountain.

Although as shown in FIGURE 3c, pulses of a value in excess of that of voltage 25 are eliminated by the discriminator circuit, the converse may be applied, namely that pulses 24 having peaks in excess of that of voltage 25 be accepted and those below voltage 25 eliminated by the discriminator circuit.

In the modification shown in FIGURE 8, pulses of a value below that of the voltage 25 are eliminated.

Referring to FIGURE 8, the discs 9, 14 are identical with those already described with reference to FIGURES 2a and 2b, and the scanning means is the same as that described with reference to FIGURE 1 with the difference that there is inserted between the discs 9, 14, a photoelectric cell 27 in a light tight housing 28 having an aperture 29. A lamp 30 is secured adjacent the aperture 29; but the disc 9 is positioned between the lamp 30 and housing 28 so that on rotation of the disc 9 the fingers cyclically interrupt the light beam passing through the aperture 29, so that the photoelectric cell 27 produces a cyclic pulse output. The voltage waveform from the photoelectric cell 27 is shown graphically in FIGURE 11b, the output voltage varying cyclically between a voltage $V_6$ and an arbitrary voltage $V_7$ as the light passes between two adjacent fingers of the disc 9.

The relationship between the positions of the photoelectric cells 20 and 27 is such that when the cell 20 is giving an output relative to the compared colour from the card 4, the cell 27 has an output voltage $V_6$, and when the cell 20 is giving an output relative to the master colour from the card 1 the cell 27 gives an output voltage $V_7$.

The photoelectric cell 20 has an output voltage waveform as shown in FIGURE 11a, the voltage varying between voltage $V_1$ and voltage $V_3$. When the light beam is interrupted by the disc 9, the output voltage $V_1$ or voltage $V_3$ from the photoelectric cell 20 drops, or rises, to voltage $V_2$. This voltage level $V_2$ will be exactly midway between voltages $V_1$ and $V_3$, if the two colours are identical and a 50% transmission neutral density filter is put in the compared colour reflected light path.

As voltages less than voltage $V_2$ are to be eliminated the waveform of FIGURE 11a must be modified. The value of the voltage $V_2$ is used as a reference. An "and gate" 31 is used as an eliminator.

The output from the photoelectric cell 72 is passed to an amplifier and inverter 32, whereby the waveform shown in FIGURE 11b is modified to that shown in FIGURE 11c, alternating between voltages $V_0$ and $V_3$; $V_0$ being an arbitrary voltage positive with respect to voltage $V_1$ (FIGURE 11a) and may be derived from the inverter circuit. The output from the amplifier and inverter 32 is applied, through current limiting resistance 33, FIGURE 10, to the cathode of a diode 34 in the "and gate" 31.

The output from the photoelectric cell 20, FIGURE 11a waveform, is applied to the cathode of a diode 35 in the "and gate" 31.

When the photoelectric cell 20 is scanning the master colour 1, through the least dense segment 15 of disc 14, it produces a voltage $V_1$, light passing to the photoelectric cell 27, producing a voltage $V_7$, which is modified by the inverter 32 to its lowest value $V_3$. As a result, the diode 34 is conducting hard and the anode voltage is nearly equal to the voltage $V_3$. The anode of diode 35 is, at this stage, negative to its cathode, which is at voltage $V_1$, and the diode 35 will not conduct.

As the disc 9 rotates, so the reflected light from the master colour 1 is cut off and the photoelectric cell 20 receives light from the compared colour of the card 4, giving a resultant output of voltage $V_2$, at the same time the output from the photoelectric cell drops to voltage $V_6$, corresponding to a rise to the positive voltage $V_0$ at the output side of the inverter 32.

Consequently, the voltage on the cathode of the diode 34 rises from voltage $V_3$ to voltage $V_0$, and the anode follows this rise until it equals the voltage on the cahtode of diode 35, whence diode 35 will begin to conduct, and the voltage at the anodes of both diodes 34, 35 will be substantially equal to that of the cathode of the diode 35. This voltage would correspond to voltage $V_2$, but as the cathode of the diode 34 continues to rise to a value substantially equal to that of $V_0$, which is positive in respect of $V_2$, the diode 34 will cease to conduct, and will remain non-conductive until the reflecting finger of the disc 9 ceases to reflect light from the compared colour 4 and again allows light from the master colour 1 to reach the photoelectric cell 20, when the cathode voltage of the diode 34 will again fall to voltage $V_3$ (that is, rise to voltage value $V_0$ from the inverter 32).

The output waveform from the "and gate" 31, FIGURE 11d, alternates between voltage $V_3$, which is representative of black, and, voltage $V_2$, which is the compared colour.

The output from the "and gate" 31 is feed to the anode of a diode 36, a half wave peak detector 136, the diode conducting as the voltage rises to voltage $V_2$, charging a capacitor 37 at this voltage.

A current limiting resistance 38 is inserted in the line connecting the voltage source $V_0$ to the respective anodes of diodes 34, 35, 36.

When the anode of the diode 36 drops to the voltage $V_3$, the diode stops conducting, and the capacitor will commence to discharge through the resistance 39, the voltage falling slightly before being boosted back to the voltage value $V_2$ by the second cycle having the waveform of FIGURE 11d.

The values of the capacitor 37 and resistance 39 should be such that this voltage drop is insignificant compared with the minimum height of a pulse in waveform of FIGURE 11a.

The output from the capacitor/resistance loop provides a virtually steady voltage of the waveform shown in FIGURE 11e, of a magnitude corresponding to the voltage $V_2$. This voltage is fed, through resistance 40 to the grid of a triode 41 in the discriminator 42. The triode 41 will conduct when its cathode voltage rises by virtue of the current passing through the resistance 43, to a steady value equal to the voltage $V_2$, and at the same time increase the cathode voltage of a second triode 44.

The output from the photoelectric cell 20 in the waveform shown in FIGURE 11a is fed to the grid of the triode 44 so that this triode will only conduct during the time that the components of the waveform shown in FIGURE 11a are positive in respect to the voltage $V_2$. Thus the part of the waveform of FIGURE 11a above the voltage $V_2$ will appear at the anode of the triode 44 in amplified and inverted form.

The anode of the triode 44 is fed from a positive source through a resistance 45, the value of which is chosen to limit the current passing through the triode 44 so that the output pulses are clipped to substantially all the same level. The voltage value, like that of the voltage $V_0$, is arbitrary and positive in respect of voltages $V_1$ by an amount depending upon the characteristics of the valves chosen.

The output of the discriminator circuit has a waveform such as shown in FIGURE 11f, the output may be fed, through a capacitor 47, to a computer for correction purposes or to an integrator 46 which will produce a steady current proportional to the number of pulses received per cycle of the discs 9, 14. The output of the integrator is then indicated as by a milliammeter 48, giving an indication of colour value.

When it is desired that the comparator actually be used for controlling the ink supply, a standard number may first be obtained for the given colour, and the number stored in a register 49, FIGURE 7. The register may be of known type. Known means for periodically reading this number into a second register or comparison circuit 50, interconnect the registers 49 and 50.

The register 50 has a capacity in excess of the number of filters on the disc 14 and is so circuited that it can subtract from the number received from the register 49 the number of pulses per cycle received from the discriminator circuit, that is, the number corresponding to the number from the colour under test. Thus there is entered in the register 50 a difference number corresponding to the error between the master colour and the compared colour. This difference number may be a positive one or a negative one depending on whether the reflected light derived from the compared colour is more or less intense than that derived from the master colour. To control the direction of adjustment of the ink fountain a direction sense discriminator circuit 51 is coupled to the last stage of the register 50.

If the number corresponding to the difference between master and compared colours is negative, then the last stage of the register 50 will contain a count in decimal form, that is, the register counts 5, 4, 3, 2, 1, 0, 99, 98, etc., therefore a negative number would correspond, for example, to the decimal ninety's. As an example, if there were 80 stages on the disc 14, 90 could never be used as a positive number. It will be understood that the register 50 may also work on the binary system.

The sense discriminator 51 monitors the last stage of the register 50 and sets the direction control on the ink fountain correction device accordingly.

A read out device 52, of known type, is coupled to the register 50 and reads out, digit by digit the difference number stored in the register 50, passing each digit to the solenoid operating the ratchet and pawl mechanism in the ink fountain control device, and at the same time clearing the register 50 ready for the reinsertion of the number entered in the register 49.

In FIGURE 12 there is shown an ink fountain unit capable of being controlled by the colour comparator. This ink fountain forms the subject matter of application Ser. No. 54,634, filed Sept. 8, 1960, now U.S. Patent No. 3,057,294 and therefore will only briefly be outlined herein. An ink fountain blade 53 can be locally flexed to or from a roller 54 by means of a plurality of adjusting screws 55 extending parallel with the blade.

Each screw 55 has a pair of ratchet wheels 56, 57 secured to it, the teeth of each pair of ratchets being opposite, that is, one pawl will move one ratchet wheel clockwise and the other pawl will move the other ratchet wheel anticlockwise.

For each ratchet wheel 56, 57 there is a co-operating pawl 58, 59, the pawls being pivotally mounted on a common pin 60, to a carrier 61 which can rise and fall in a guide 62. A bank of solenoids 63 equal in number to the number of carriers 61 (and thus equal to the number of ink fountain adjustment screws) is carried in a support 64 pivotally mounted at its ends to the sides of the ink fountain. The support 64 is reciprocated up and down by linkage, generally designated 65.

Energisation of a given solenoid will cause engagement between the solenoid and the carrier 61 associated therewith, whereby the reciprocatory motion of the solenoid will be imparted to the carrier. The pawls associated with the carrier will thus rise and fall, but do not normally engage their associated ratchet wheels. To effect rotation of the ink fountain adjustment screws 55, one of a pair of solenoids, not shown, is energised to move a bar 66 in either direction laterally of the printing press. Projecting from the bar 66 are pairs of pins 67, 68, each pair of pins being associated with one of the pairs of pawls 58, 59. Thus when the bar 66 is moved in one direction under the control of one of the solenoids, one of the pins 67, 68 will move its associated pawl 58, 59, into operative engagement with its associated ratchet 56, 57, and the reciprocating of the carrier will be transmitted to the ink fountain screw, thereby adjusting the ink supply. Movement of the bar in the opposite direction will cause engagement of the other pawl and ratchet and cause an opposite adjustment to the selected ink fountain screw.

The bar controlling solenoids are controlled by the sense discriminator 51, whereby more or less ink will be allowed to pass from the ink fountain, and each reciprocation of the carrier or carriers 61 is counted by the read out device 52 until the appropriate numerical correction has been made to the ink supply.

A plurality of scanning heads and discriminator circuits may be utilised for effecting accurate colour control, each scanning head and associated circuit in effect controlling one or more ink fountain screws, the outputs from the various discriminator circuits being cyclically fed to the register 50. Likewise register 40 could be cyclically programmed to produce a series of numbers corresponding to the required master colours on a given width of sheet passing through the printing press, the master colour numbers being computed at points corresponding to each ink fountain control screw.

What I claim is:

1. A colour comparator for comparing a colour with a master colour comprising means for illuminating a master colour and the compared colour, means for transmitting light from said master colour and from said compared colour, and means having segments of increasing opacity for sequentially varying the intensity of light transmitted from the master colour, means for interrupting the light transmitted from the master colour through each segment of the intensity varying means alternately with the light transmitted from the compared colour, photoelectric cell means responsive to the thus interrupted light received alternately from the master colour and the compared colour, a discriminator circuit energized with voltages from said photoelectric cell means proportional to the light transmitted to said cell means from the master colour and the compared colour, and circuit responsive means for indicating the relationship between the master colour and the compared colour.

2. A colour comparator according to claim 1 wherein the means for cyclically varying the intensity of light transmitted from the master colour, comprises a disc having sectors of increasing opacity rotated in the transmitted light beam from the master colour and the interrupting means comprises a disc having spokes of reflecting surfaces, alternating with, and being the same arcuate width as, transparent spaces between the spokes, the disc being rotated in the path of the light from both master colour and from the compared colour.

3. A colour comparator according to claim 2 wherein the sum of the arcuate widths of a reflecting surface spoke and an adjoining transparent space is equal to the arcuate width of a sector of the intensity varying disc.

4. A colour comparator according to claim 1 including means to feed the discriminator circuit with a reference voltage, said means comprising a second light source, and a second photoelectric cell means arranged so that the aforesaid interrupting means disc rotates therebetween.

5. A colour comparator according to claim 1 wherein the intensity varying means and the interrupting means comprise a common disc having, in divisions of equal arcuate width, alternating sectors of reflecting surfaces and sectors of increasing opacity.

6. A colour comparator according to claim 1 including colour filters selectively interposed between the light transmitted from the master colour and the compared colour, and means for interposing said colour filters into the paths of the light transmitted from the master colour and from the compared light during alternate cycles of varying the light intensity from the master colour whereby the hues of the colours can be compared.

References Cited by the Examiner

UNITED STATES PATENTS 2,678,581   5/1954   Reisner _____ 250—233 X
2,956,472   10/1960  Hildebrand _____ 250—233 X JEWELL H. PEDERSEN, *Primary Examiner.*

E. J. CONNORS, W. L. SIKES, *Assistant Examiners.*